Figure 1:
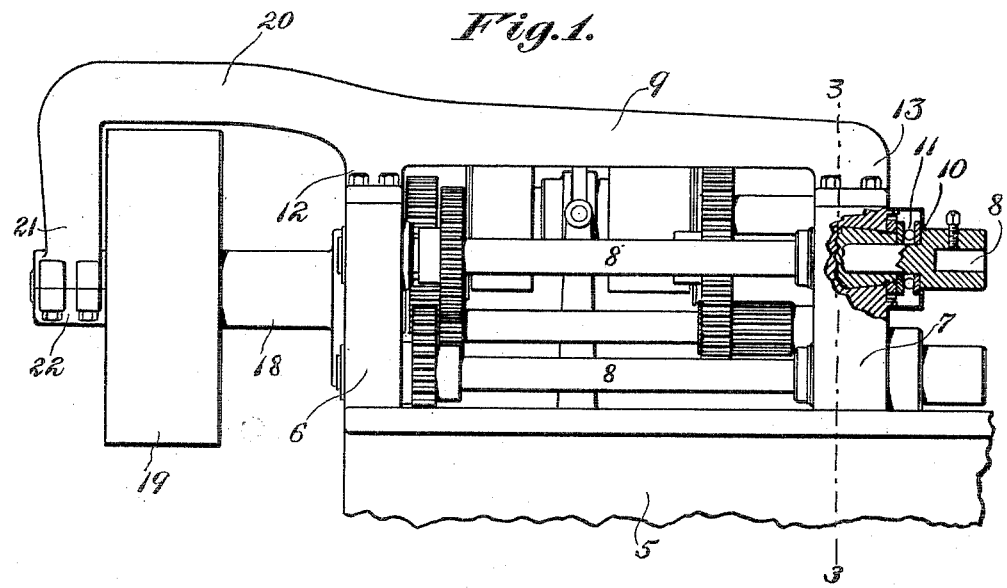

R. S. BROWN.
BEARING MECHANISM.
APPLICATION FILED JULY 5, 1912.

1,078,606.

Patented Nov. 18, 1913.

Witnesses:
L. P. Markel.
James H. Keane

Inventor:
Robt. S. Brown
By his Attorneys,
Sutherland Anderson

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

BEARING MECHANISM.

1,078,606. Specification of Letters Patent. Patented Nov. 18, 1913.

Application filed July 5, 1912. Serial No. 707,658.

*To all whom it may concern:*

Be it known that I, ROBERT S. BROWN, a citizen of the United States, residing at New Britain, in the county of Hartford and State of Connecticut, have invented certain new and useful Improvements in Bearing Mechanism, of which the following is a specification.

This invention relates to bearing mechanism, among the objects of the invention being the provision of a device of the character noted having means for rigidly and substantially supporting one or more spindles or shafts and for effectually resisting and distributing the thrusts of the same.

The invention possesses other features of novelty and advantage which with the foregoing will be described at length in the following description wherein I will set forth in detail that one of the several forms of embodiment of the invention which I have selected for illustration in the drawings accompanying and forming part of the same, this disclosure being to enable those skilled in the art to practice the invention. I do not limit myself to such disclosure; I may depart therefrom in several respects within the scope of the invention defined by the claim following said description.

Figure 2:
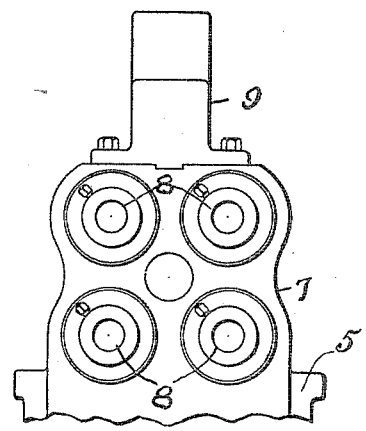
Figure 3:
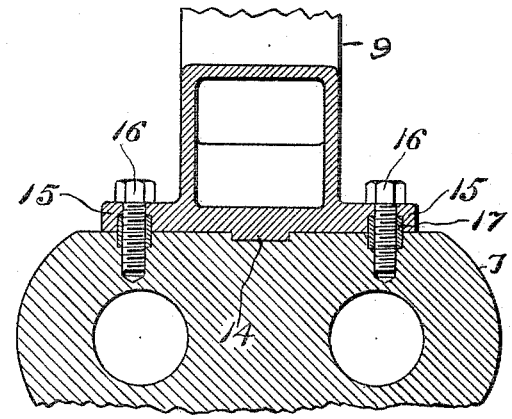

Referring to said drawings: Figure 1 is a side elevation of bearing mechanism involving my invention. Fig. 2 is a front elevation of the same, and, Fig. 3 is a transverse section on the line 3—3 of Fig. 1.

Like characters refer to like parts throughout the several views.

While I do not limit myself to the embodiment of my improvements in any particular kind of machine, they are of especial utility when associated with or forming part of a multiple-spindle automatic turret-machine such for example as shown in Letters Patent No. 874,035 granted December 17, 1907 to George G. Prentice, to which reference may be had and which is partly illustrated in the drawings. The machine shown comprises in its organization a bed 5 at the head end of which are disposed at least two rigid supports or uprights as 6 and 7 which are usually, but not necessarily, made integral with said bed. These uprights or supports 6 and 7 sustain one or more spindles 8. In the construction shown there are four of such spindles, although this is not a point of consequence. These spindles may be equipped with tools and operate after the fashion shown in the Letters Patent to which I have already alluded. No claim is made herein to the spindles or driving mechanism therefor, for which reason the same need not be described, although I will allude hereinafter to a shaft from which said tools receive their motion precisely as shown in said Letters Patent.

Connecting the uprights or supports 6 and 7 is a brace or bridge member 9 which is fixedly united therewith in some convenient way, one form of which will hereinafter be described. To the spindles 8 are fixed the collars 10 and between these collars and the front support 7 are disposed anti-friction thrust bearings 11. It will be understood that the thrust applied to the spindles 8 during work is toward the head end of the machine or toward the left in Fig. 1, the thrust being initially taken up by the support 7 and through the bridge member, brace or strut 9 being transferred to the support or upright 6 so that such thrust is not only effectively resisted but is distributed over a considerable area, the parts 6 and 7 and 9 jointly receiving the thrust.

The tops of the supports or uprights 6 and 7 are flat and fitted flatwise against the same are the short pendent arms or branches 12 and 13 interlocked with the respective supports for instance by forming tongues or fins 14 on said branches adapted to comparatively snugly fit grooves or channels in the tops of the respective supports or uprights which contribute in preventing relative motion of the supports 6, 7 and brace 9. The said branches or arms 12 and 13 are provided with laterally extending feet 15 also having a flat bearing against said supports or uprights 6 and 7, said laterally extending feet or flanges 15 being preferably bolted to the supports by bolts or screws as 16 which extend through perforations in the respective feet or flanges and are tapped into the respective supports to thereby substantially maintain the brace or tie member 9 in operative relation with the two supports 6 and 7 which it ties together. The openings in the supports 6 and 7 and feet or flanges 15 which receive the bolts or screws 16 are counterbored to receive bushings 17 which are driven firmly or tightly in said counterbores, the bolts passing freely through the bushings so that no undue care is necessary in inserting the bolts.

The support or upright 6 aids in sustaining the shaft 18 to which is fastened the pulley 19, the driving connections of which are, however, not shown. From this shaft 18 the spindles are driven exactly as shown in the Letters Patent hereinbefore mentioned. The brace or bridge member 9 is shown provided at its outer end with an outward prolongation or extension 20 having a pendent arm 21 approximately parallel with the adjacent support 6, and this pendent arm is shown provided at its lower end with a bearing portion 22 to receive the outer end of the shaft 18 so that the part 9 in addition to acting as a thrust transferring and receiving factor also aids in rigidly and substantially supporting the driving shaft 18.

What I claim is:

The combination of a bed, supports rigid with and rising from the bed, a spindle sustained by the supports, a shaft carried by the outer support, and a bridge member tying together the two supports and provided with a bearing portion for said shaft.

In testimony whereof I affix my signature in presence of two witnesses.

ROBERT S. BROWN.

Witnesses:
HEATH SUTHERLAND,
H. H. PEASE.

---

Copies of this patent may be obtained for five cents each, by addressing the "Commissioner of Patents, Washington, D. C."